No. 768,848. PATENTED AUG. 30, 1904.
F. I. FISCHER.
DISINFECTING APPARATUS FOR BARBERS' IMPLEMENTS.
APPLICATION FILED DEC. 23, 1903.
NO MODEL. 2 SHEETS—SHEET 1.
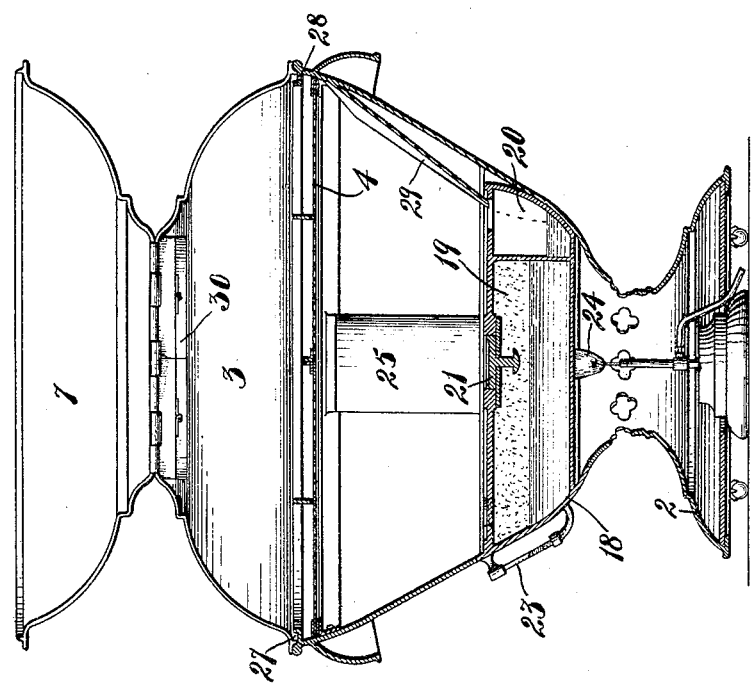
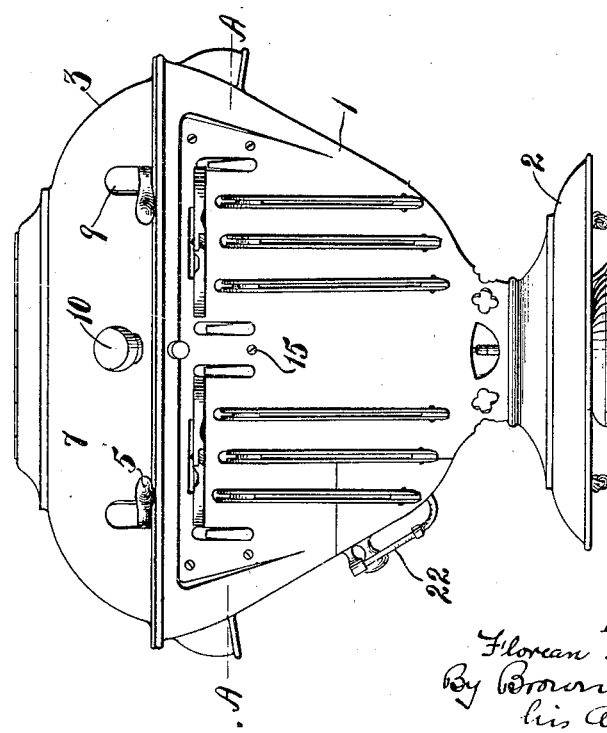

No. 768,848. PATENTED AUG. 30, 1904.
F. I. FISCHER.
DISINFECTING APPARATUS FOR BARBERS' IMPLEMENTS.
APPLICATION FILED DEC. 23, 1903.
NO MODEL. 2 SHEETS—SHEET 2.
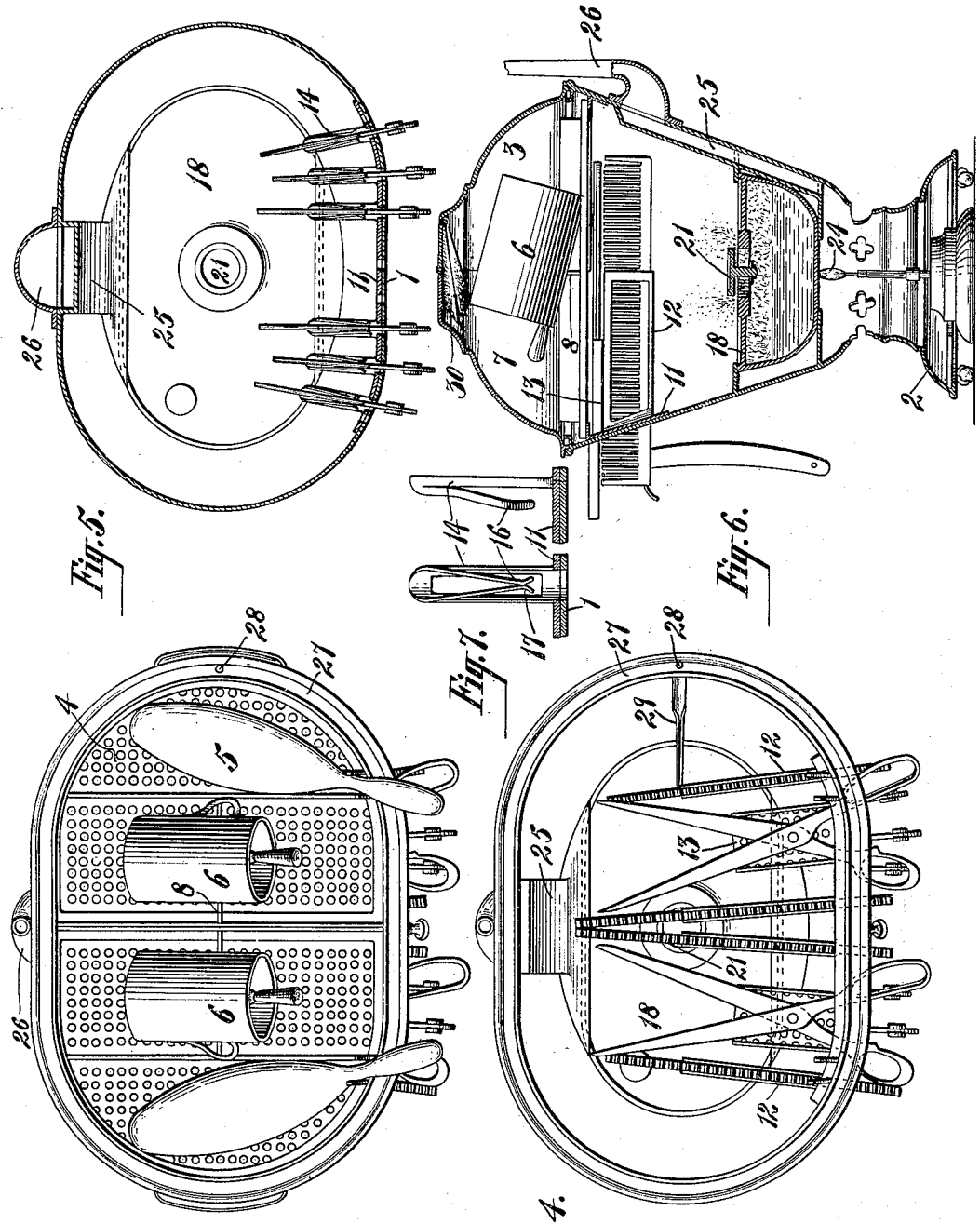

No. 768,848. Patented August 30, 1904.

UNITED STATES PATENT OFFICE.

FLOREAN I. FISCHER, OF NEW YORK, N. Y.

DISINFECTING APPARATUS FOR BARBERS' IMPLEMENTS.

SPECIFICATION forming part of Letters Patent No. 768,848, dated August 30, 1904.

Application filed December 23, 1903. Serial No. 186,278. (No model.)

*To all whom it may concern:*

Be it known that I, FLOREAN I. FISCHER, a citizen of the United States, and a resident of the borough of Manhattan, in the city and State of New York, have invented a new and useful Disinfecting Apparatus for Barbers' Implements, of which the following is a specification.

My invention relates to disinfecting apparatus for barbers' implements, with the object in view of providing convenient and efficient means for keeping the implements cleansed and preventing the gathering of moisture on the articles, which would tend to injure them.

A practical embodiment of my invention is represented in the accompanying drawings, in which—

Figure 1 is a view of the apparatus in front elevation as it appears when in use. Fig. 2 is a vertical section of the body portion, taken therethrough from side to side and showing the hinged portion of the cover thrown open. Fig. 3 is a top plan view of the body portion, the cover being removed. Fig. 4 is a similar view with the perforated diaphragm removed. Fig. 5 is a horizontal section in the plane of the line A A of Fig. 1. Fig. 6 is a vertical section from front to rear, and Fig. 7 is a plan and side view of the skeleton razor-pocket.

The preferred form of casing is that illustrated in the drawings, which is urn-shaped, the body-portion being denoted by 1, the base by 2, and the crowned cover by 3. This shape has its advantages in economy of the antiseptic disinfecting vapor and gives at the same time an extended space for the reception of implements.

At or near the top of the body portion there is a removable perforated diaphragm 4, on which the brushes and shaving-cups rest, as shown in Fig. 3, the brushes being denoted by 5 and the shaving-cups by 6. To gain access to these, the cover has a hinged section 7, which may be thrown open and the brushes and cups lifted from their positions on the diaphragm. The cups are preferably held in tilting adjustment by means of a suitable supporting-bracket 8, Fig. 6. The handles of the implements project forwardly through slots 9 in the hinged portion of the cover, and for convenience in handling the cover I provide it with the knob or handle 10.

Below the perforated diaphragm 4 comb and shear-pockets are provided as follows: A plate 11 is fastened to the inner face of the front of the casing 1, and from this extend inwardly in a substantially horizontal direction comb-pockets 12, shear-pockets 13, (see Fig. 4,) and razor-pockets 14. These several pockets for the comb, shears, and razors are connected with this one plate, which plate is removably secured to the front of the body by screws 15. These several pockets are made to admit the free flow of antiseptic vapor around and out of contact with the implements laid thereon, and the razor-pocket is provided with spring-clamping jaws 16 17 in the entrance ends of the pockets, so that the end of the razor may be received between them after it enters the outer opening in the pocket and will be thence guided along its position as it is shoved inwardly to place its blade wholly within the body of the vessel.

The cover has one or more towel-pockets 30 attached to its inner face.

In the lower part of the body portion of the casing there is a space provided for a sliding tank 18, which has one compartment, 19, for the reception of the disinfecting fluid and another compartment, 20, for the reception of the condensed liquid after it has done its disinfecting work in the form of a vapor. The tank 18 may be slid horizontally into and out of its position within the casing and is provided in its top with a vertically-movable valve 21, which is intended to be so weighted that it will lift when the vapor has produced a pressure which will insure its escape in the form of a dry steam.

At the front of the tank 18 two indicators are placed, one (denoted by 22) to determine the degree of heat which the liquid has reached and one (denoted by 23) to indicate the height of water in the tank. Heat is conveniently applied to the base of the tank 18 by a gas-flame 24; but it is to be understood that any other suitable or convenient source of applying heat to the tank may be utilized—as, for example, by the oil-flame where gas is not convenient. The products of combustion are carried away along a flue 25 and thence into an uptake 26, which may be higher or lower, as occasion may require to produce more or less draft.

The dry vapor or steam which has escaped past the valve 21 and come in contact with the various implements within the casing is finally condensed by its contact with the inner walls of the casing, and particularly with the inner face of the cover 3, and is collected as it flows along down the inner face of the cover in an annular trough 27, which discharges through an opening 28 into a downwardly-extended pipe or trough 29, which conducts the liquid into the compartment 20 of the tank 18, from which it may be poured or otherwise removed when the tank 18 is withdrawn.

It is obvious that changes might be resorted to in the form and arrangement of the several parts without departing from the spirit and scope of my invention. Hence I do not wish to limit myself strictly to the structure herein shown and described; but

What I claim is—

A disinfecting apparatus for barbers' implements comprising a suitable casing for the reception of the implements, a tank for disinfecting fluid arranged to be moved into and out of its position and open to the interior of the casing only through a discharge-valve, means for applying heat to the bottom of the tank to vaporize the fluid therein, a discharge-valve seated in the top of the tank and arranged to lift under a predetermined pressure of fluid vaporized by the heat and means for collecting the condensed vapor exterior to the tank.

In testimony that I claim the foregoing as my invention I have signed my name, in presence of two witnesses, this 5th day of December, 1903.

FLOREAN I. FISCHER.

Witnesses:
FREDERICH G. HACHENBERG,
FREDK. HAYNES.